United States Patent [19]

Nagano

[11] Patent Number: 4,586,913

[45] Date of Patent: May 6, 1986

[54] FRONT DERAILLEUR FOR A BICYCLE

[75] Inventor: Masashi Nagano, Izumi, Japan

[73] Assignee: Shimano Industrial Company Limited, Osaka, Japan

[21] Appl. No.: 641,291

[22] Filed: Aug. 16, 1984

[30] Foreign Application Priority Data

Aug. 16, 1983 [JP] Japan .................. 58-126664[U]

[51] Int. Cl.[4] .................. F16H 9/24; F16H 11/08
[52] U.S. Cl. ........................ 474/80; 474/82
[58] Field of Search .............. 474/80, 82; 267/57, 267/155

[56] References Cited

U.S. PATENT DOCUMENTS

| Re. 31,854 | 3/1985 | Egami | 474/82 |
| 2,601,753 | 7/1952 | Zipf | 267/155 X |
| 4,078,444 | 3/1978 | Huret | 474/82 |
| 4,199,853 | 4/1980 | Fricker | 308/4 A X |

FOREIGN PATENT DOCUMENTS

| C 8974 | 12/1956 | Fed. Rep. of Germany | 474/80 |
| 2844122 | 4/1979 | Fed. Rep. of Germany | 474/80 |

Primary Examiner—Stuart S. Levy
Assistant Examiner—Katherine Matecki
Attorney, Agent, or Firm—Stevens, Davis, Miller & Mosher

[57] ABSTRACT

A front derailleur for a bicycle includes a chain guide reciprocably supported to a fixing member through a pair of linkage members. The chain guide has a pair of inner and outer plates opposite to each other and a coiled return spring interposed between the chain guide and either the fixing member or the linkage member. The return spring biases the chain guide in the direction of backward movement. A cap is provided to cover the spring to protect it from debris. The cap includes an elastically deformable cylindrical fitting portion to be fitted onto the coiled portion of the return spring. The cylindrical fitting portion has an axially extending slit which enables the cap to be fitted on the outer periphery of the coiled portion through expansion of the slit. The cap includes structure for positioning the cap such that the slit is adjacent to the inner plate of the chain guide.

6 Claims, 10 Drawing Figures

FRONT DERAILLEUR FOR A BICYCLE

FIELD OF THE INVENTION

This invention relates to a front derailleur for a bicycle, and more particularly to a front derailleur for a bicycle, which is adapted to switch a driving chain from one to another of a plurality of front chain gears for changing the bicycle speed.

BACKGROUND OF THE INVENTION

Generally, this kind of front detrailleur is so constructed that a chain guide having inner and outer plates is supported to reciprocate through operation of a pair of linkage members connected to a fixing member fixed to a seat tube at the bicycle frame. A return spring having a coiled portion and first and second retaining ends and biasing the chain guide in the direction of backward movement is interposed between the chain guide and either the fixing member or one linkage member. A control wire attached to one linkage member is pulled to move the chain guide forwardly against the return spring, the wire being released to move the chain guide backwardly by a restoring force of the return spring.

Since the front derailleur is mounted onto the seat tube between the front and rear wheels, mud splashed from the rear wheel lodges in the gaps between the coiled wires of the return spring, resulting in a reduction in the spring action of the return spring, creaks at the coiled portion, and a tendency to rust.

Conventionally, a cylindrical member with a bore having a diameter slightly larger than an outer diameter of the coiled portion of the return spring is fitted on the return spring to thereby prevent attachment of the mud.

The cylindrical member in the conventional front derailleur is bottomed and provided at the bottom with a center bore and at the peripheral wall with a guide slot extending axially and receiving the first end of the return spring. Further, such conventional cylindrical member is fitted onto the coiled return spring so that a pivot pin is inserted into the coiled spring and into the center bore at the cylindrical member. The pivot pin connects the one linkage member and chain guide to thereby assemble the cylindrical member with the return spring. Hence, a problem has been created in that the spring and cylindrical member are not stationary to each other, thus making assembly thereof difficult.

SUMMARY OF THE INVENTION

In light of the above problem, this invention has been designed. An object of the invention is to provide a front derailleur which uses a cap having a cylindrical fitting portion which is elastically deformable. The cap is to be fitted onto the return spring after it has been assembled on the body of the derailleur so that a simple operation constituting merely fitting the cap onto the return spring provides shielding for the coiled portion of the spring from mud and dirt, and results in the cap being held in a proper position.

This invention is characterized in that derailleur is provided which includes a cap having an elastically deformable cylindrical fitting portion which is to be fitted onto the coiled return spring is formed. The cylindrical fitting portion includes a slit extending axially of the cylindrical fitting portion. The slit can be expanded due to the elasticity of the cap so that the slit is larger than an outer diameter of the coiled return spring, i.e., when the cylindrical fitting portion is elastically deformed. The cylindrical fitting portion also includes a positioning means for setting the slit in a position where it is directed toward, i.e., adjacent to, the inner plate at the chain guide.

Hence, during assembly after the return spring is assembled onto the body of the derailleur, the cylindrical fitting portion at the cap is elastically deformed to expand the slit larger than an outer diameter of the coiled return spring and then is fitted onto the return spring, so that the return spring can simply be covered at its coiled portion with the cap. Also, the inner plate at the chain guide is used to prevent entry of mud through the slit into the cylindrical fitting portion of the cap since the slit faces the inner plate. Therefore, the coiled portion of the return spring is reliably covered by the cap so as to prevent attachment of mud and the cap is easy to mount at one stroke, thereby remarkably improving the assembly efficiency.

In addition, a preferred embodiment of the positioning means of the invention provides an engaging recess engageable with the first retaining end of the return spring, and a modified embodiment of the same provides an engaging recess provided at the chain guide and engageable with one of a pair of opposite mounting segments for mounting the chain guide to one linkage member.

Other objects and aspects of the invention will become apparent from the following description of various embodiments with reference to the accompanying drawings in which:

DETAILED DESCRIPTION OF THE INVENTION

Figure 1:
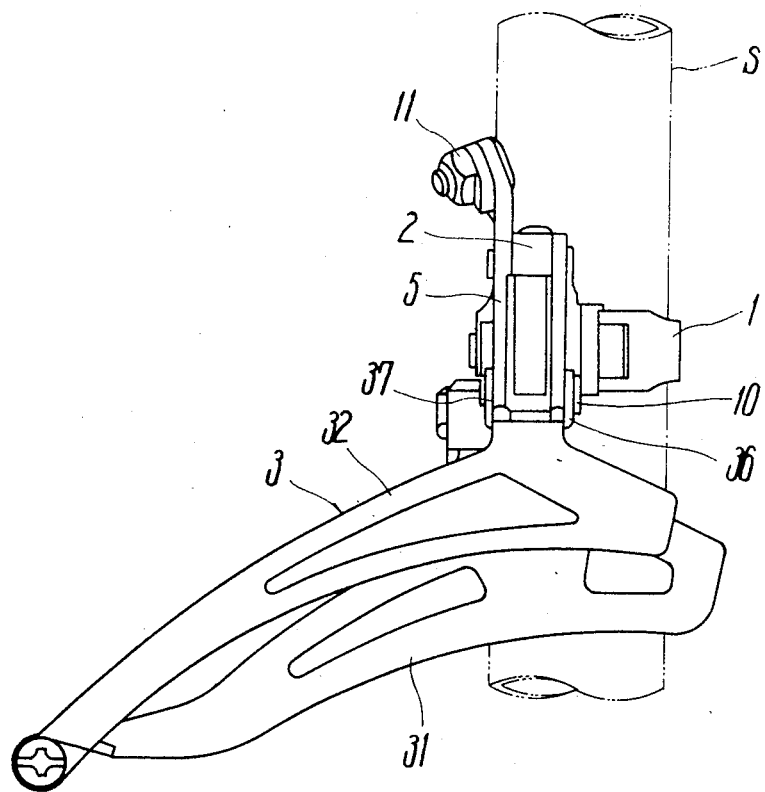
FIG. 1 is a front view of an embodiment of a front derailleur of the invention.

The front derailleur of the invention basically comprises a fixing member 2 fixed to a seat tube S at the bicycle frame through a tightening band 1, a chain guide 3, a pair of linkage members 4 and 5 for supporting the chain guide 3 movably in reciprocation with respect to the fixing member 2, and a return spring 6 having a coiled portion 61, the linkage members 4 and 5 being pivoted at one of their ends to the fixing member 2 through two pivot pins 7 and 8 and at their other ends to the chain guide 3 through pivot pins 9 and 10.

The chain guide 3 comprises an inner plate 31 and an outer plate 32 opposite to each other and spaced at an interval larger than a width of a driving chain carried by a front chain gear and a connecting plate 33 for connecting the plates 31 and 32. A pair of first mounting segments 34 and 35 are opposite to each other and project outwardly from the inner plate 31, and a pair of second mounting segments 36 and 37 opposite to each other projecting upwardly from the connecting plate 33. The first mounting segments 34 and 35 are pivoted to the linkage member 4 through the pivot pin 9, and the second mounting segments 36 and 37 are pivoted to the linkage member 5 through the pivot pin 10.

Figure 2:
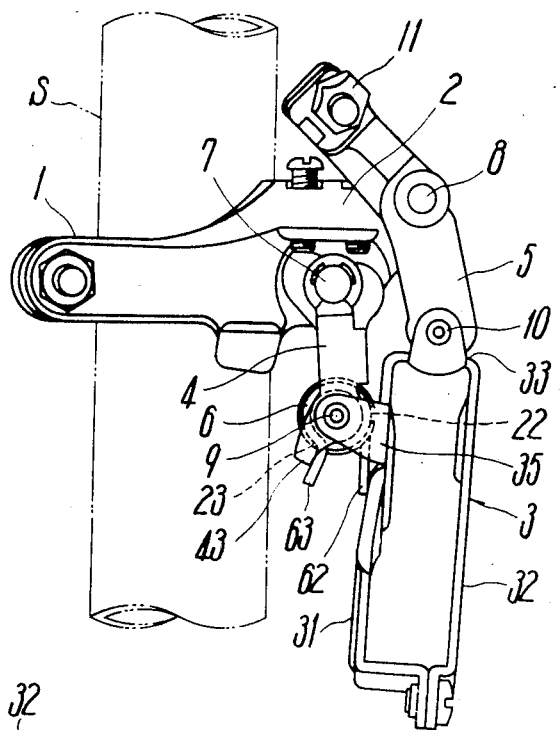
FIG. 2 is a side view of the FIG. 1 embodiment.
Figure 3:
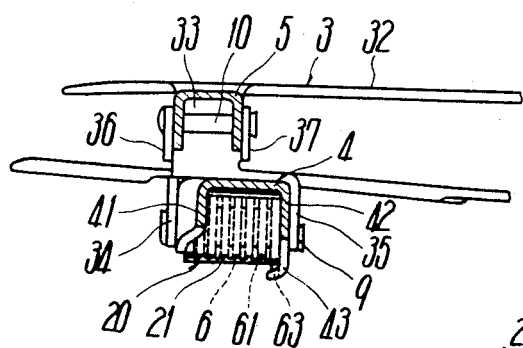
FIG. 3 is a cross-sectional plan view of the same.
Figure 4:
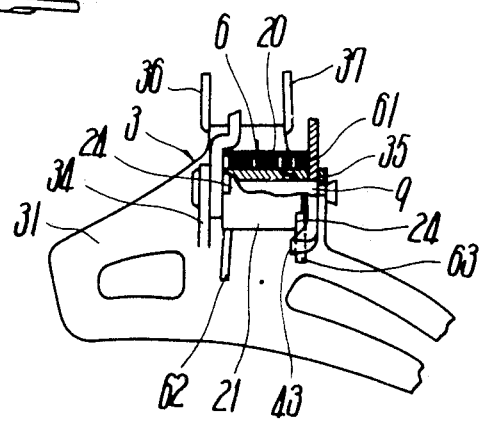
FIG. 4 is a partially omitted rear view of the same.
Figure 5:
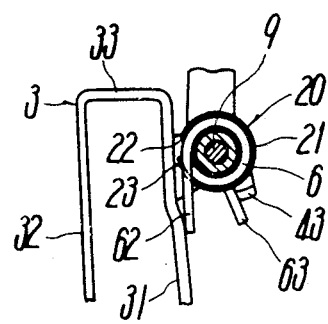
FIG. 5 is a longitudinally sectional side view of the principal portion of the same.

The return spring 6, as shown in FIGS. 2 and 3, comprises the coiled portion 61 and first and second retaining ends 62 and 63 extending tangentially outwardly of the coiled portion 61. The coiled portion 61 is fitted onto the pin 9 between the first mounting arms 34 and 35, in turn opposite side walls 41 and 42 at the linkage member 4. The first retaining end 62 engages with the outside surface of inner plate 31, and the second retaining end 63 engages with a pawl 43 provided at the end of linkage member 4, thereby contracting the coiled portion 61 in diameter to bias the chain guide 3 in the direction of backward movement. A control wire (not shown) fixed to the linkage member 5 through a fixture 11 is pulled to swing the linkage members 4 and 5 against the return spring 6 and move chain guide 3 forwardly axially of the front chain gears and toward a high speed front chain gear, while the control wire is released to move chain guide 3 backwardly toward a low speed front chain gear by use of a restoring force of return spring 6.

Referring to FIGS. 1 through 6, a first embodiment of the front derailleur of the invention constructed as abovemention is shown, in which a cap 20 having a cylindrical fitting portion 21 elastically deformable to be fitted onto the coiled portion 61 at the return spring 6 is formed. Cylindrical fitting portion 21 is provided at one circumferential side thereof with a slit 22 extending axially of and throughout the cylindrical fitting portion 21. The cylindrical fitting portion 21 is elastically deformed to expand the slit 22 larger than an outer diameter of coiled portion 61 so as to be fitted thereon. At one axial end of cap 20 is provided an engaging recess 23 engageable with the first retaining end 62 of return spring 6 so that the engagement of recess 23 with first retaining end 62 restrains the cap 20 from rotation with respect to the return spring 6, thereby always keeping the slit 22 directed to the outside surface of inner plate 31.

The cap 20 is formed of a cylindrical member smaller in thickness, than and about equal in axial length to, the coiled portion 61 at the return spring 6. Cylindrical fitting portion 21 is located between both axial ends of the cap 20. The cylindrical fitting portion 21 is provided at both axial ends with guide portions 24 for drawing out the second retaining end 63 at the return spring 6 radially outwardly from the fitting portion 21 and with the engaging recesses 23. Guide portions 24 and engaging recesses 23 are axially symmetrical respectively.

Figure 6:
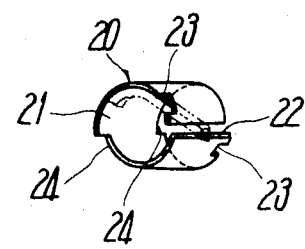
FIG. 6 is a perspective view of a cap only.
Figure 7:
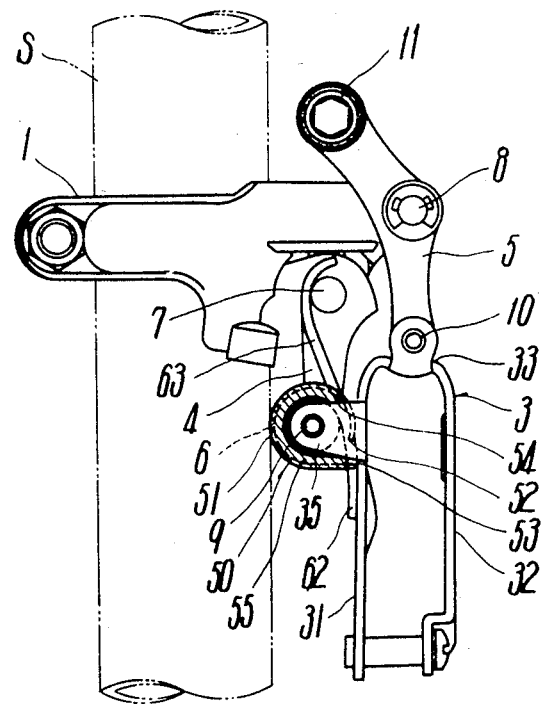
FIG. 7 is a partially cutaway side view of a modified embodiment of the invention.
Figure 8:
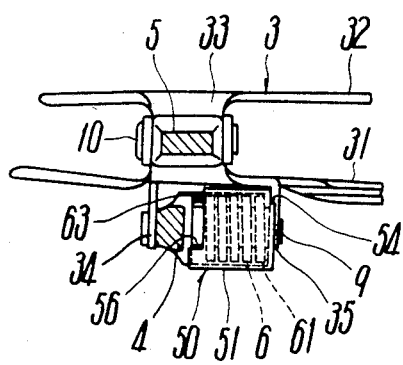
FIG. 8 is a cross-sectional plan view of the FIG. 7 embodiment.
Figure 9:
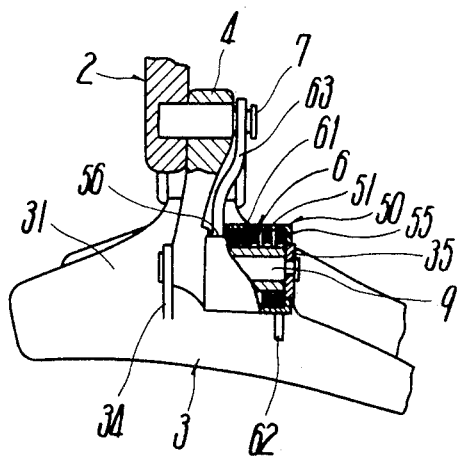
FIG. 9 is a partially omitted rear view of the same.
Figure 10:
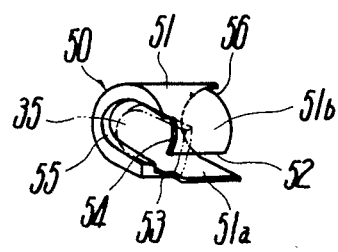
FIG. 10 is a perspective view of a cap only at the same.

The engaging recesses 23 are disposed in such a manner that one is at one side of slit 22 and the other at the other side of the same and are skewed with respect thereto, the guide portions 24 being circumferentially opposite to the slit 22 and extending circumferentially reversely i.e., in opposite directions, as shown in FIG. 6.

In addition, the cap 20 is formed of synthetic resin and the cylindrical fitting portion 21 has elasticity. Alternatively, the cap 20 may be formed of a metal plate, which is not defined.

During assembly return spring 6 is supported at the coiled portion 61 thereof onto the pivot pin 9 and engages at the first retaining end 62 with the outside surface of inner plate 31 and at the second retaining end 63 with the pawl 43 at the linkage member 4. Thereafter, to mount cap 20 onto spring 6, the cylindrical fitting portion 21 at the cap 20 is elastically deformed to expand the slit 22 to be larger than an outer diameter of the coiled portion 61 at the return spring 6 and is then fitted onto the coiled portion 61 through the slit 22. The engaging recess 23 at the cap 20 engages with the first retaining end 62 at the return spring 6 to thereby position the cap 20 to allow the slit 22 to face the outside surface of inner plate 31, and the cylindrical portion 21 is restored by an elastic-restoring force thereof to its original size, so that the cap 20 is held onto the coiled portion 61. Such simple operation to mount the cap 20 can cover the coiled portion 61 and also hold the cap 20 in position. The cap 20 is provided at both axial ends with the engaging recesses 23 and guide portions 24 in relation of being symmetrical as described above so that the cap 20, when fitted, is free from the need for precise orientation during mounting and can be mounted wiht a high degree of accuracy.

Now, for a front derailleur having the return spring 6 interposed between the chain guide 3 and the pivot pin 7 fixed to the fixing member 2, a cap 50 may be formed as follows:

The cap 50 is cylindrical, smaller in thickness, and larger in axial length then the coiled portion 61 at the return spring 6. Cap 50 includes an elastically deformable cylindrical fitting portion 51 at one axial end only. At one radial side of cylindrical fitting portion 51 is provided a slit 52. A portion 51a of cap 50 at one side of slit 52 is made flat and provided at one axial end with a recess 53 engageable with the first retaining end 62 of return spring 6. A portion 51b at the other side of slit 52 is provided at one axial end with a recess 54 engageable with the first mounting segment 35. A positioning means comprising the engaging recesses 53 and 54 allows the slit 52 to always face the inner plate 31, and at one axial end of cap 50, that is, at the axial end forming the recesses 53 and 54, is provided an inward flange 55 extending radially inwardly and opposite to one axial end of coiled portion 61. At the other axial end of cap 50 is provided a guide portion 56 for guiding the second retaining end 63 of return spring 6 rearwardly outwardly from the cylindrical fitting portion 51. Linkage member 4 is provided at one end with a wall opposite to the other axial end of coiled portion 61.

During mounting of cap 50 onto spring 6, cylindrical fitting portion 51 at the cap 50, the same as in the embodiment in FIGS. 1 through 6, is elastically deformed to expand the slit 52 and is fitted onto the coiled portion 61 at the return spring 6 through the slit 52. Recess 53 engages with the first retaining end 62 of return spring 61, the recess 54 engaging with the upper edge of first mounting segment 35 and positioning the cap 50 to allow the slit 52 to face the inner plate 31 and holding the cap 50 on the coiled portion 61 by elastically restoring the cylindrical fitting portion 51. In this case, the inward flange 55 and the wall of linkage member 4 can cover both axial ends of coiled portion 61 to thereby prevent entry of mud into the coiled portion 61 at the return spring 6.

In addition, in this embodiment, one engaging recess 53 or 54 need only be used.

Although several embodiments have been described, they are merely exemplary of the invention and are not to be construed as limiting, the invention being defined solely by the appended claims.

What is claimed is:

1. A front derailleur for a bicycle, including a fixing member, a chain guide having an inner plate and an outer plate, a pair of linkage members supporting said chain guide to reciprocate with respect to said fixing member, a return spring including a coiled portion and first and second retaining ends extending therefrom, said return spring biasing said chain guide in a direction of backward movement, a cap having an elastically deformable cylindrical fitting portion fitted onto an outer periphery of said coiled portion of said return spring, said cylindrical fitting portion of said cap having an axially extending slit which is expandable to a width larger than an outer diameter of said coiled portion of said return spring due to elastic deformation of said cylindrical fitting portion, said cap also having a positioning means for positioning said slit adjacent to said inner plate of said chain guide.

2. A front derailleur for a bicycle according to claim 1, wherein said positioning means comprises an engaging recess engageable with the first retaining end of said return spring.

3. A front derailleur for a bicycle according to claim 2, wherein said cap comprises a guide portion through which the second retaining end of said return spring is guided out from said cylindrical fitting portion.

4. A front derailleur for a bicycle according to claim 3, wherein each axial end of said cap includes a said engaging recess and a said guide portion, said engaging recesses and said guide portions being disposed on said axial ends in a symmetrical manner.

5. A front derailleur for a bicycle according to claim 1, wherein said chain guide has a pair of mounting segments opposite to each other and a pivot pin mounted across said mounting segments, one of said linkage members being pivoted to said pivot pin, said coiled portion of said return spring being supported to said pivot pin, the first retaining end of said return spring engaging with said inner plate of said chain guide, the second retaining end of said return spring engaging with at leat one of said linkage member and said fixing member supporting said linkage member, said positioning means comprising a first engaging recess which is engageable with the first retaining end, said first engaging recess for positioning said slit adjacent to said inner plate at said chain guide.

6. A front derailleur for a bicycle according to claim 5, wherein said positioning means comprises a second engaging recess engageable with one of said mounting segments, said second engaging recess cooperating with said first engaging recess to position said slit adjacent to said inner plate of said chain guide.

* * * * *